(12) United States Patent
Rangarajan et al.

(10) Patent No.: US 10,503,523 B2
(45) Date of Patent: Dec. 10, 2019

(54) TECHNOLOGIES TO IMPROVE SYSTEM BOOT PERFORMANCE AND RELIABILITY

(71) Applicant: Intel Corporation, Santa Clara, CA (US)

(72) Inventors: Ravi Poovalur Rangarajan, Hillsboro, OR (US); Xiang Ma, Portland, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 15/638,741

(22) Filed: Jun. 30, 2017

(65) Prior Publication Data

US 2019/0004825 A1 Jan. 3, 2019

(51) Int. Cl.
| | | |
|---|---|---|
| *G06F 9/44* | (2018.01) |
| *G06F 9/445* | (2018.01) |
| *G06F 9/24* | (2006.01) |
| *G06F 9/4401* | (2018.01) |

(52) U.S. Cl.
CPC .......... *G06F 9/44505* (2013.01); *G06F 9/24* (2013.01); *G06F 9/4411* (2013.01); *G06F 9/44578* (2013.01)

(58) Field of Classification Search
CPC .................................................. G06F 9/44578
See application file for complete search history.

(56) References Cited

U.S. PATENT DOCUMENTS

| | | | | |
|---|---|---|---|---|
| 5,274,834 A * | 12/1993 | Kardach | ............. | G06F 9/30043 710/260 |
| 2012/0191964 A1* | 7/2012 | Lee | ..................... | G06F 11/2284 713/2 |
| 2013/0159687 A1* | 6/2013 | Cox, Jr. | ............... | G11C 7/1066 713/1 |
| 2015/0378956 A1* | 12/2015 | Dearth | ................ | G06F 13/4234 710/308 |
| 2017/0286679 A1* | 10/2017 | Khare | | |

OTHER PUBLICATIONS

"Understanding DDR Memory Training", 4 pages, posted on Nov. 23, 2016 by user "Damien Zammit". Retrieved from Internet: <https://github.com/librecore-org/librecore/wiki/Understanding-DDR-Memory-Training> (Year: 2016).*
"It's (Mostly) in the PHY", 3 pages, posted over 3 years ago by user "Ashwin Matta". Retrieved from Internet: <https://community.arm.eom/processors/b/blog/posts/it-s-mostly-in-the-phy> (Year: 2015).*

* cited by examiner

*Primary Examiner* — Jae U Jeon
(74) *Attorney, Agent, or Firm* — Barnes & Thornburg LLP (57) ABSTRACT

Technologies for optimization of a memory controller include a computing device having a memory manager, a memory trainer, and a platform firmware. The memory manager reserves a space in memory of the computing device that is inaccessible to an operating system of the computing device. The memory trainer utilizes the reserved space to perform a memory training to determine configuration settings of the memory controller. After the configuration settings of the memory controller have been determined, the platform firmware configures the memory controller with the determined configuration settings.

18 Claims, 4 Drawing Sheets

TECHNOLOGIES TO IMPROVE SYSTEM BOOT PERFORMANCE AND RELIABILITY

BACKGROUND

Typical computing devices use high-speed memory devices such as double-data rate (DDR) memory. These computing devices are exposed to varying environments. As such, the operational conditions of these computing devices change throughout their lifetime. These changes in operational conditions have an impact on how memory controllers of these computing devices operate. The memory controllers may initially be configured for a given operational condition.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
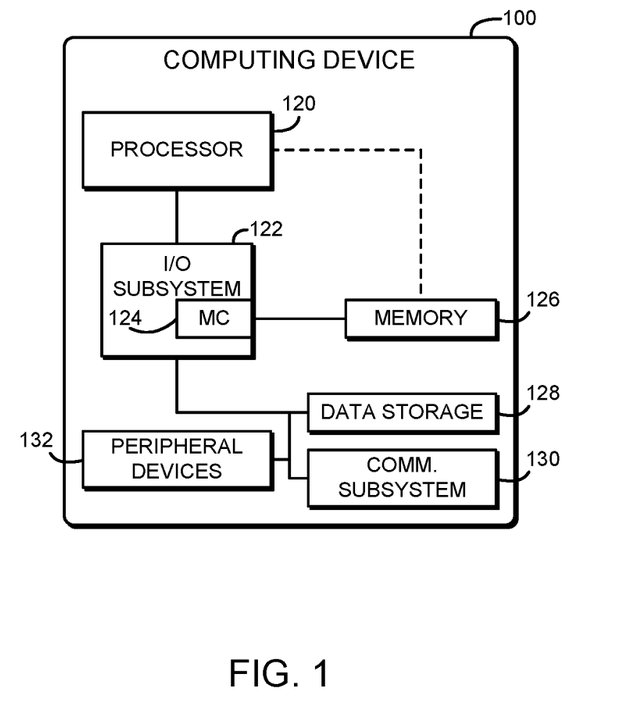
FIG. 1 is a simplified block diagram of at least one embodiment of a computing device for optimization of a memory controller.

Referring now to FIG. 1, an illustrative computing device 100 for optimization of a memory controller is shown. In use, as described below, the computing device 100 performs dynamic memory training to periodically optimize the memory controller by determining the configuration settings given the current operational conditions of the memory controller. The configuration settings may include voltage and timing parameters of the memory controller. The computing device 100 may initially perform the memory training during the normal boot process if there are no previous configuration settings stored on the computing device 100. This may establish an initial baseline of configuration settings to determine the optimal voltage and timing parameters of the memory controller. These parameters may optimize the performance of the memory controller when the computing device 100 is fully operational. Additionally, the computing device 100 may perform periodic memory training to update the memory controller parameters for the current operational conditions of the memory controller. Thus, by periodically adapting the memory controller parameters, the computing device 100 may ensure that the memory controller provides optimum performance for current conditions. As a result, the computing device 100 may improve overall reliability and performance as compared to traditional devices that may not implement dynamic memory training. The computing device 100 may improve system reliability using existing components, with no additional cost in terms of hardware (e.g., silicon area or board components), software, performance, or power. Additionally, the computing device 100 may improve boot performance by performing dynamic memory training rather than performing memory training on every boot.

The computing device 100 may be embodied as any type of device capable of performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes a processor 120, an I/O subsystem 122, a memory 126, and a data storage device 128. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 126 may be embodied as any type of volatile or non-volatile memory or data storage capable of performing the functions described herein. In operation, the memory 126 may store various data and software used during operation of the computing device 100 such operating systems, applications, programs, libraries, and drivers. The memory 126 is communicatively coupled to the processor 120 via the I/O subsystem 122, which may be embodied as circuitry and/or components to facilitate input/output operations with the processor 120, the memory 126, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In the illustrative embodiment, the I/O subsystem 122 includes a memory controller (MC) 124. The memory controller 124 may be embodied as any controller, functional block, or other circuitry that communicates data and control information with the memory 126, as described further below. In the illustrative embodiment, the memory controller 124 is embodied as a subcomponent of the I/O subsystem 122. In other embodiments, the memory controller 124 may be a separate component from the I/O subsystem 122. In some embodiments, the memory 126 may be incorporated in the processor 120, for example as an integrated memory controller hub. Additionally, in some embodiments, the I/O subsystem 122 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 130, which may be embodied as any communication circuit, device, or collection thereof, capable of enabling communications between the computing device 100 and other remote devices over a computer network (not shown). The communications subsystem 130 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 may further include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
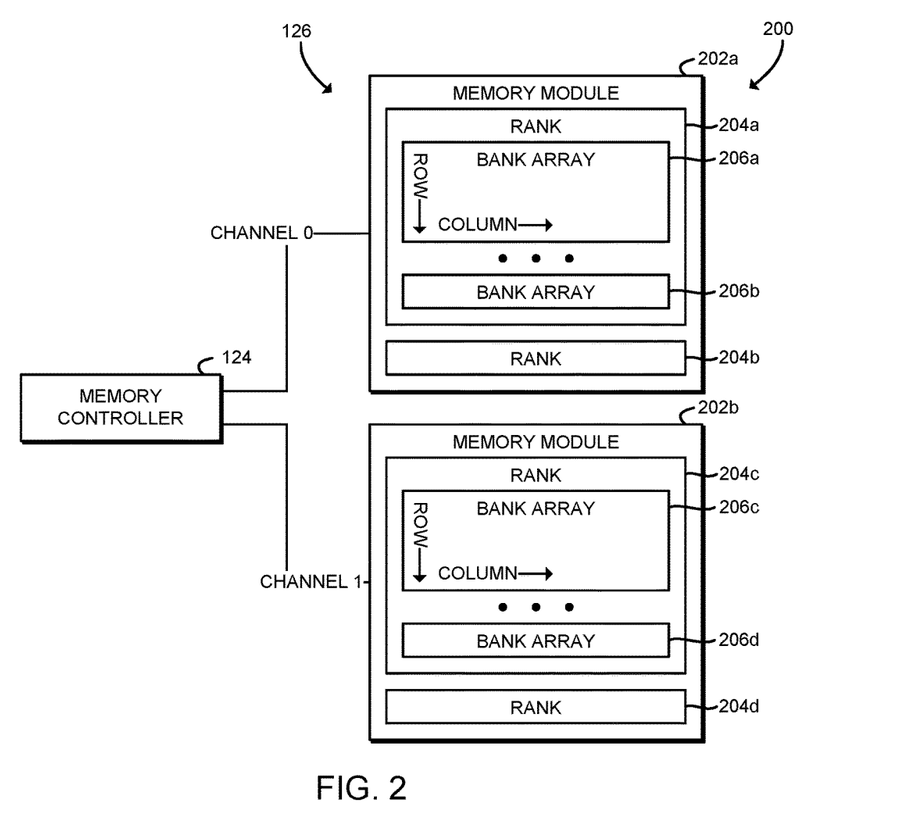
FIG. 2 is a simplified block diagram of a memory subsystem of the computing device of FIG. 1.

Referring now to FIG. 2, diagram 200 shows an illustrative embodiment of a memory subsystem of the computing device 100. As shown, the memory 126 includes two memory modules 202*a*, 202*b*. Each memory module 202 includes two memory ranks 204. In addition, each rank 204 may include one or more memory devices (e.g., DRAM chips) that may be accessed as a single rank. The ranks 204 may be accessed, for example, using a chip select (CS) signal. Each rank 204 may include multiple bank arrays 206 that each include multiple memory cells. The memory cells within each bank array 206 may be identified by row and column. As shown, each of the memory modules 202 communicates with the memory controller 124 using a dedicated memory channel. The memory modules 202 are illustratively dual inline memory modules (DIMMs). In other embodiments, the memory modules 202 may be embodied as any other memory module, card, or other component that includes multiple memory ranks 204. Additionally, although illustrated as including two modules 202, four ranks 204, and eight bank arrays 206 (four not shown) it should be understood that in other embodiments the memory 126 may include a different number of modules 202, ranks 204, and/or bank arrays 206.

Figure 3:
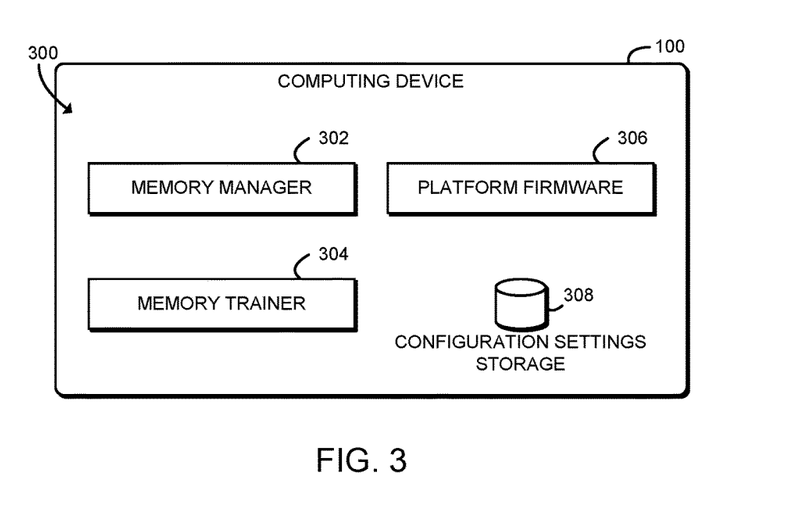
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a memory manager 302, a memory trainer 304, a platform firmware 306, and configuration settings storage 308. The various components of the environment 300 may be embodied as hardware, firmware, software, or a combination thereof. As such, in some embodiments, one or more of the components of the environment 300 may be embodied as circuitry or collection of electrical devices (e.g., memory manager circuitry 302, memory trainer circuitry 304, and/or platform firmware circuitry 306). It should be appreciated that, in such embodiments, one or more of the memory manager circuitry 302, the memory trainer circuitry 304, and/or the platform firmware circuitry 306 may form a portion of the processor 120, the I/O subsystem 122, and/or other components of the computing device 100. Additionally, in some embodiments, one or more of the illustrative components may form a portion of another component and/or one or more of the illustrative components may be independent of one another.

The memory manager 302 is configured to reserve a space in memory 126 of the computing device 100 to perform a memory training algorithm as described below. The reserved space in memory 126 may be inaccessible to an operating system of the computing device 100. In some embodiments, the memory manager 302 may reserve a memory bank of the memory 126 to perform the memory training algorithm. In some embodiments, the memory manager 302 may reserve any other space in the memory 126 that is addressed using all of the signal lines that couple the memory controller 124 to the memory 126. The signal lines may include data signal lines and I/O address lines.

The memory trainer 304 is configured to perform a memory training algorithm with the reserved space of the memory 126 to determine the configuration settings of the memory controller 124. The configuration settings may be embodied as voltage parameters, timing parameters, or other configuration parameters of the memory controller 124. The memory training algorithm may be embodied as one or more processes that perform memory read/write accesses with various timing parameters, data patterns, and other parameters in order to determine optimal configuration settings of the memory controller 124. The memory trainer 304 may be configured to perform the memory training algorithm during a boot phase of the computing device 100. In some embodiments, the memory trainer 304 may be configured to perform the memory training algorithm during the normal operation of the computing device 100. For example, the memory trainer 304 may perform the memory training algorithm while the computing device 100 is executing an operating system or other runtime processes.

The memory trainer 304 may be further configured to store the parameters determined from performing the memory training algorithm in the configuration settings storage 308. The configuration settings storage 308 may be embodied as any data storage device, firmware device, or other non-volatile storage device of the computing device 100. The memory trainer 304 may be configured to store the configuration settings in the configuration settings storage 308 after configuring the memory controller 124.

The platform firmware 306 may be embodied as any firmware that initializes and configures components of the computing device 100. For example, the platform firmware 306 may be embodied as or otherwise include a unified extensible firmware interface (UEFI) compliant firmware environment, a Core Boot firmware, a UBOOT firmware, and/or a non-UEFI firmware such as legacy BIOS. The platform firmware 306 is configured to configure the memory controller 124 with the configuration settings stored in the configuration settings storage 308 or configuration settings determined by performing the memory training algorithm In some embodiments, the platform firmware 306 may be configured to boot the computing device 100 and, during the boot phase of the computing device 100, to determine whether any configuration settings are stored in the configuration settings storage 308, and if so, to configure the memory controller 124 with the stored configuration settings.

In some embodiments, the platform firmware 306 may be configured to enter the operating system into a temporary quiescent state and access to the memory 126 of the computing device 100 during runtime, after performance of the memory training algorithm, to configure the memory controller 124 with the configuration settings. The platform firmware 306 may be further configured to resume the operating system and other access to memory 126 after configuration of the memory controller 124.

Figure 4:
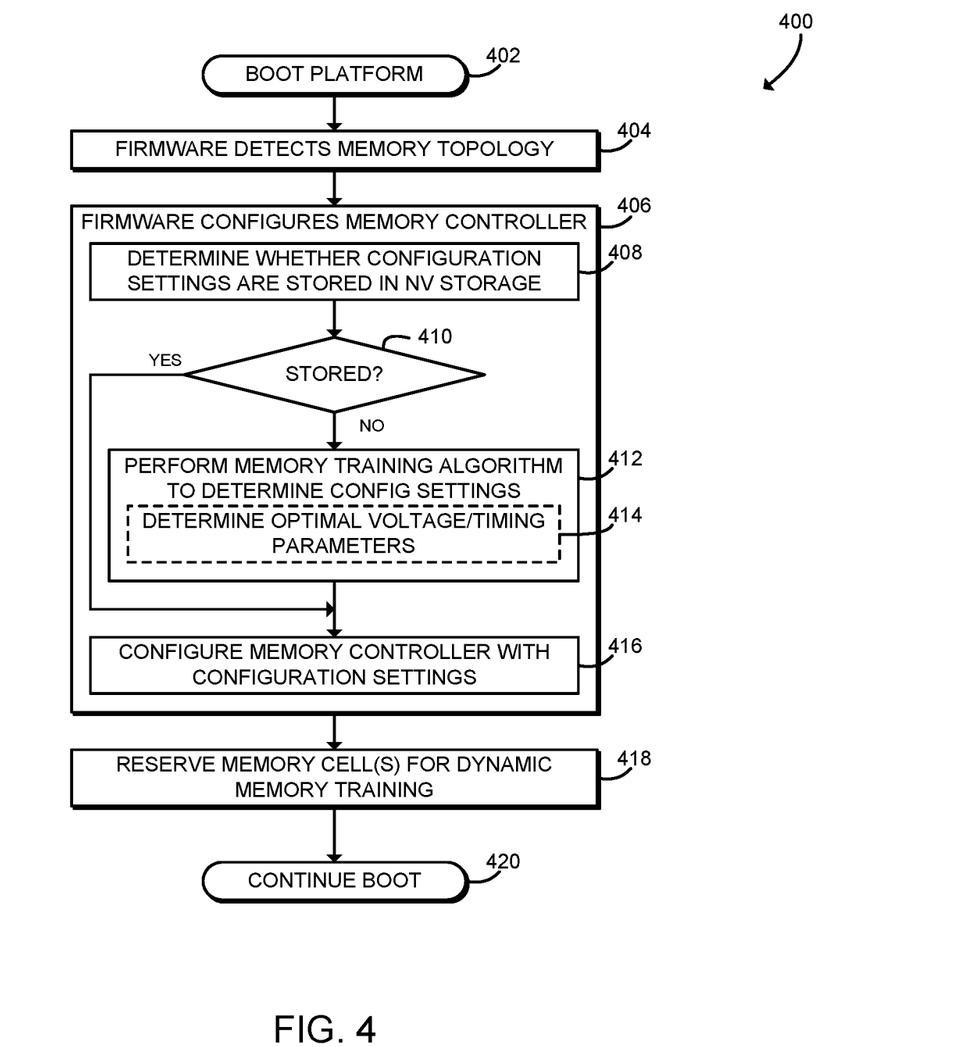
FIG. 4 is a simplified flow diagram of at least one embodiment of a method for configuration of the memory controller that may be executed by the computing device of FIGS. 1-3.

Referring now to FIG. 4, in use, the computing device 100 may execute a method 400 for configuration of a memory controller. It should be appreciated that, in some embodiments, the operations of the method 400 may be performed by one or more components of the environment 300 of the computing device 100 as shown in FIG. 3. The method 400 begins in block 402, in which the computing device 100 boots the platform. The computing device 100 may boot in response to powering on, in response to a reset, or in response to any other platform boot event that causes the memory 126 to be initialized. In response to booting the platform, the platform firmware 306 of the computing device 100 is in control of the computing device 100.

In block 404, the platform firmware 306 of the computing device 100 detects the memory topology of the computing device 100. For example, the platform firmware 306 may identify any memory modules 202, ranks 204, bank arrays 206, and/or other memory structures installed in the computing device 100.

In block 406, the platform firmware 306 of the computing device 100 configures the memory controller 124 of the computing device 100. The configuration of the memory controller 124 may optimize the memory controller 124 to improve reliability and performance of the overall system. The configuration of the memory controller 124 may include tuning the voltage or timing parameters for various signal lines connecting the memory controller 124 to the memory 126.

In block 408, the platform firmware 306 of the computing device 100 determines whether configuration settings are stored in a non-volatile data storage of the computing device 100. For example, the computing device 100 may have previously performed a memory training algorithm and saved the configuration settings to be used on the next boot of the computing device 100. One potential embodiment of a method for performing memory training and saving configuration settings is described below in connection with FIG. 5. In other embodiments, default configuration settings may be stored in the non-volatile data storage such as factory settings. In block 410, the platform firmware 306 of the computing device 100 checks whether configuration settings have been stored. If there are configuration settings stored in the non-volatile storage, then the method 400 branches ahead to block 416 to continue configuration of the memory controller 124. However, if there are no configuration settings stored, then the method 400 advances to block 412.

In block 412, the platform firmware 306 of the computing device 100 performs a memory training algorithm to determine the configuration settings. The memory training algorithm may include performing memory read/write accesses with various timing parameters and data patterns to determine optimal configuration settings for the memory controller 124. In some embodiments, in block 414, the platform firmware 306 may determine optimal voltage or timing parameters for the memory controller 124.

In block 416, the platform firmware 306 of the computing device 100 configures the memory controller 124 with the configuration settings. The configuration of the memory controller 124 may provide better reliability as the computing device 100 operates in variable environments. For example, the configuration settings may improve available margin for various data and control signals between the memory controller 124 and the memory 126.

After configuring the memory controller 124, in block 418 the platform firmware 306 of the computing device 100 reserves memory cell(s) for dynamic memory training during an operational state of the computing device 100. One potential embodiment of a method for dynamic memory training is described below in connection with FIG. 5. The reserved memory cells are not available for use by an operation system or other runtime computer programs of the computing device 100. For example, the memory cells may be excluded from a memory map provided by the platform firmware 306 to the operating system. In some embodiments, the reserved memory cells may be embodied as a memory bank. In other embodiments, the reserved memory cells may be embodied as any other set of memory cells that are addressable using all of the signal lines that couple the memory controller 124 to the memory 126 of the computing device 100. The signal lines may include, for example, data signal lines and I/O address signal lines.

In block 420, the platform firmware 306 of the computing device 100 continues with the boot phase of the computing device 100. This may include performing normal processes during the boot phase of the computing device 100 as well as transitioning to a runtime phase, for example by loading an operating system. After continuing with the boot phase, the method 400 is completed.

Figure 5:
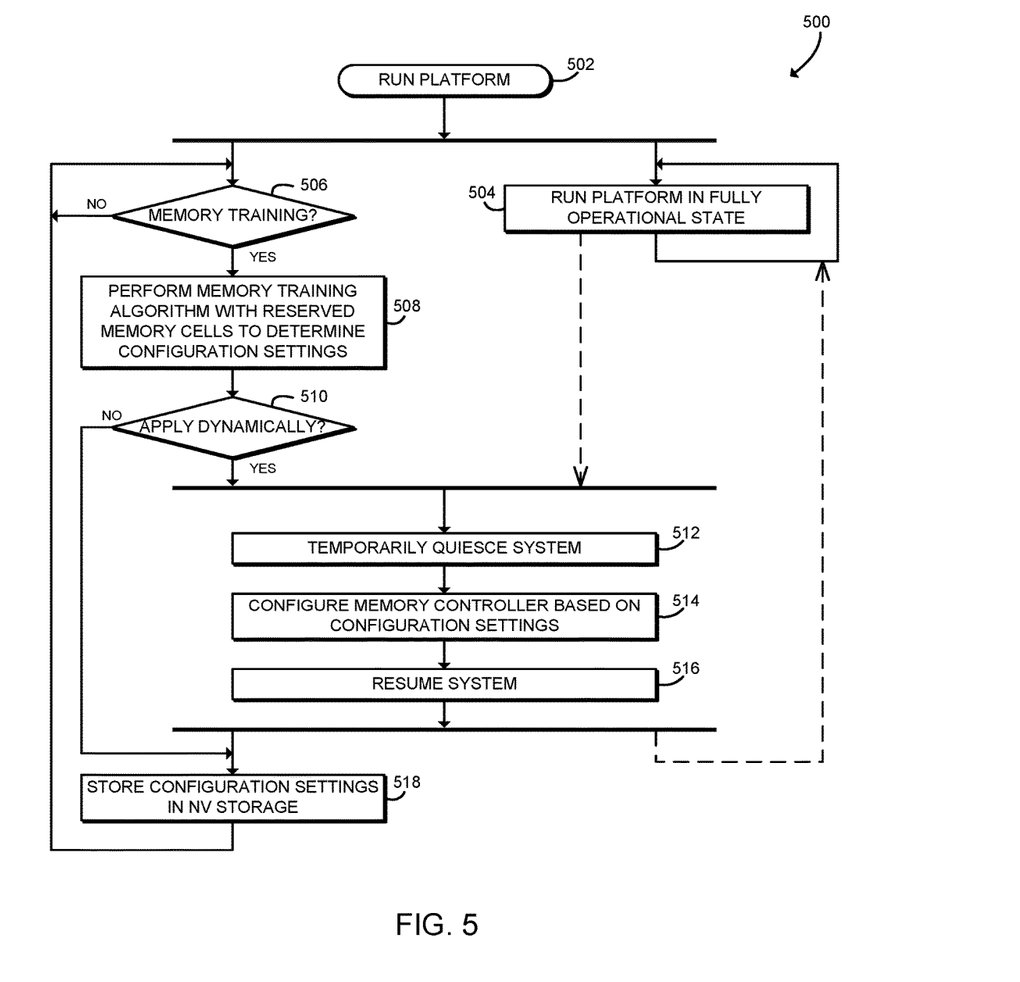
FIG. 5 is a simplified flow diagram of at least one embodiment of a method for runtime memory configuration that may be executed by the computing device of FIGS. 1-3.

Referring now to FIG. 5, in use, the computing device 100 may execute a method 500 for runtime configuration of a memory controller. It should be appreciated that, in some embodiments, the operations of the method 500 may be performed by one or more components of the environment 300 of the computing device 100 as shown in FIG. 3. The method 500 begins in block 502, in which the computing device 100 starts a runtime phase of execution for the platform. For example, as described above, an operating system may be started by the platform firmware 306. After starting the runtime phase, the method 500 proceeds in parallel to blocks 504, 506.

In block 504, the computing device 100 runs the platform in a fully operational state. This may correspond to normal runtime operation of the computing device 100. The computing device 100 may, for example, execute an operating system, one or more applications, and/or other runtime computer programs. The computing device 100 may continue to execute in the fully operational state until a further event occurs, as described below.

Referring back to block 502, the method 500 proceeds in parallel to blocks 504, 506. In block 506, the computing device 100 determines whether to perform dynamic memory training while the computing device 100 continues to run the platform in a fully operational state. For example, the computing device 100 may periodically perform dynamic memory training (e.g., after the expiration of a predetermined time period) or otherwise perform dynamic memory training on a predetermined schedule. The determination of whether to perform memory training may be performed by the platform firmware 306 of the computing device 100 or another entity that is independent from the operating system. If the computing device 100 determines that no memory training is required, the method 500 loops back to block 506 to continue determining whether memory training is required. Alternatively, if the computing device 100 determines that memory training is required, then the method 500 advances to block 508.

In block 508, the computing device 100 performs a memory training algorithm with reserved memory cells to determine configuration settings of the memory controller 124. The memory training algorithm may include performing memory read/write accesses to the reserved memory cells with various timing parameters and data patterns to determine optimal configuration settings for the memory controller 124. The reserved memory cells are not accessible to runtime computer programs such as the operating system. Thus, even though the memory training algorithm may overwrite or otherwise modify the contents of the reserved memory cells, the computing device 100 may perform the memory training algorithm without disturbing the computing device 100 running the platform in a fully operational state.

In block 510, the computing device 100 determines whether to apply the changed configuration settings dynamically. For example, the computing device 100 may be configured to apply changes dynamically and/or to postpone changes until the next platform reset. If the computing device 100 decides that the changes are not to be applied immediately, then the method 500 branches ahead to block 518. However, if the computing device 100 determines that the changes are to be applied dynamically, then the method 500 advances to block 512.

In block 512, the platform firmware 306 of the computing device 100 temporarily quiesces operation of the computing device 100. Temporarily quiescing the computing device 100 may halt, suspend, or otherwise interrupt normal operation of the computing device 100, allowing the memory 126 to enter a consistent state. Quiescing the computing device 100 may cause the computing device 100 to enter a single-threaded mode of execution, for example by suspending execution of an operating system and applications. For example, to quiesce the system, the computing device 100 may send an interrupt or other instruction to the operating system of the computing device 100. Quiescing the system causes the method 500 to branch from running the platform in a fully operational state in block 504 to quiescing the system in block 512, for example by suspending execution of the operating system.

In block 514, the platform firmware 306 of the computing device 100 configures the memory controller 124 based on the configuration settings determined during the memory training process. The platform firmware 306 may configure the memory controller 124 as described above in connection with block 416 of FIG. 4.

In block 516, the platform firmware 306 of the computing device 100 resumes the operations of the computing device 100. For example, the computing device 100 may send an instruction to the operating system to leave the quiescent state and return to the fully operational state. After resuming operations, the method 500 proceeds in parallel to blocks 504, 518. In block 504, the computing device 100 runs in a fully operational state as described above.

After resuming the system, the method 500 also advances to block 518, in which the computing device 100 may store the configuration settings in a non-volatile storage. Referring back to block 510, if the computing device 100 does not apply the configuration settings dynamically, the method 500 may also branch directly to block 518. After being stored, the configuration settings may later be accessed by the platform firmware 306 as described above in connection with FIG. 4. For example, the computing device 100 may apply the configuration settings after the next platform reset. After storing the configuration settings in non-volatile storage, the method 500 loops back to block 506 to determine if further memory training is required.

It should be appreciated that, in some embodiments, the methods 400 and/or 500 may be embodied as various instructions stored on a computer-readable media, which may be executed by the processor 120, the I/O subsystem 122, and/or other components of the computing device 100 to cause the computing device 100 to perform the method 400 and/or 500, respectively. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for configuring a memory controller, the computing device comprising: a memory manager to reserve a space in a memory of the computing device to perform a memory training, wherein the reserved space in the memory is inaccessible to an operating system of the computing device; a memory trainer to perform the memory training within the reserved space to determine configuration settings of the memory controller;

and a platform firmware to configure the memory controller with the determined configuration settings.

Example 2 includes the subject matter of Example 1, and wherein to determine the configuration settings comprises to determine an optimal voltage parameter or an optimal timing parameter.

Example 3 includes the subject matter of any of Examples 1 and 2, and wherein the memory trainer is further to store the configuration settings of the memory controller in a data storage of the computing device.

Example 4 includes the subject matter of any of Examples 1-3, and wherein to store the configuration settings comprises to store the configuration settings in the data storage in response to configuration of the memory controller with the determined configuration settings.

Example 5 includes the subject matter of any of Examples 1-4, and wherein the platform firmware is further to: boot the computing device; and determine whether there are configuration settings stored in a data storage of the computing device in response to the boot of the computing device; wherein to configure the memory controller comprises to configure the memory controller with the configuration settings stored in the data storage in response to a determination that there are configuration settings stored in the data storage.

Example 6 includes the subject matter of any of Examples 1-5, and wherein to perform the memory training comprises to perform the memory training during a boot phase of the computing device.

Example 7 includes the subject matter of any of Examples 1-6, and wherein to perform the memory training comprises to perform the memory training during normal operation of the computing device.

Example 8 includes the subject matter of any of Examples 1-7, and wherein the platform firmware is further to: temporarily limit access to the memory of the computing device in response to the performance of the memory training during normal operation of the computing device; and configure the memory controller in response to temporarily limiting the access to the memory of the computing device.

Example 9 includes the subject matter of any of Examples 1-8, and wherein the platform firmware is further to resume the access to the memory of the computing device in response to the configuration of the memory controller with the determined configuration settings.

Example 10 includes the subject matter of any of Examples 1-9, and wherein to perform the memory training during normal operation of the computing device further comprises to: execute an operating system with the computing device; and perform the memory training contemporaneously with execution of the operating system with the computing device.

Example 11 includes the subject matter of any of Examples 1-10, and wherein the reserved space in the memory comprises a memory bank of the memory to perform the memory training.

Example 12 includes the subject matter of any of Examples 1-11, and wherein the reserved space in the memory is accessed by a plurality of signal lines of the computing device, wherein the signal lines couple the memory controller to the memory.

Example 13 includes the subject matter of any of Examples 1-12, and wherein the memory controller and the memory are coupled by a plurality of data signal lines and a plurality of I/O address lines, wherein the signal lines comprise the data signal lines and the I/O address lines.

Example 14 includes a method for configuring a memory controller, the method comprising: reserving, by a computing device, a space in a memory of the computing device for performing a memory training, wherein the reserved space is inaccessible to an operating system of the computing device; performing, by the computing device, the memory training within the reserved space in the memory of the computing device to determine configuration settings of the memory controller; and configuring, by the computing device, the memory controller with the determined configuration settings.

Example 15 includes the subject matter of Example 14, and wherein determining the configuration settings comprises determining an optimal voltage parameter or an optimal timing parameter.

Example 16 includes the subject matter of any of Examples 14 and 15, and further comprising storing, by the computing device, the configuration settings of the memory controller in a data storage of the computing device.

Example 17 includes the subject matter of any of Examples 14-16, and wherein storing the configuration settings comprises storing the configuration settings in the data storage in response to configuring the memory controller with the determined configuration settings.

Example 18 includes the subject matter of any of Examples 14-17, and further comprising: booting the computing device; and determining, by the computing device, whether there are configuration settings stored in a data storage of the computing device in response to booting the computing device; wherein configuring the memory controller comprises configuring the memory controller with the configuration settings stored in the data storage in response to determining that there are configuration settings stored in the data storage.

Example 19 includes the subject matter of any of Examples 14-18, and wherein performing the memory training comprises performing the memory training during a boot phase of the computing device.

Example 20 includes the subject matter of any of Examples 14-19, and wherein performing the memory training comprises performing the memory training during normal operation of the computing device.

Example 21 includes the subject matter of any of Examples 14-20, and further comprising: temporarily limiting, by the computing device, access to the memory of the computing device in response to performing the memory training during normal operation of the computing device; wherein configuring the memory controller with the determined configuration settings comprises configuring the memory controller in response to temporarily limiting the access to the memory of the computing device.

Example 22 includes the subject matter of any of Examples 14-21, and further comprising resuming, by the computing device, access to the memory in response to configuring the memory controller with the determined configuration settings.

Example 23 includes the subject matter of any of Examples 14-22, and wherein performing the memory training during normal operation of the computing device further comprises: executing, by the computing device, an operating system with the computing device; and performing, by the computing device, the memory training contemporaneously with executing the operating system with the computing device.

Example 24 includes the subject matter of any of Examples 14-23, and wherein the reserved space in the memory comprises a memory bank of the memory for performing the memory training.

Example 25 includes the subject matter of any of Examples 14-24, and wherein the reserved space in the memory is accessed by a plurality of signal lines of the computing device, wherein the signal lines couple the memory controller to the memory.

Example 26 includes the subject matter of any of Examples 14-25, and wherein the memory controller and the memory are coupled by a plurality of data signal lines and a plurality of I/O address lines, wherein the signal lines comprise the data signal lines and the I/O address lines.

Example 27 includes a computing device comprising: a processor; and a memory having stored therein a plurality of instructions that when executed by the processor cause the computing device to perform the method of any of Examples 14-26.

Example 28 includes one or more non-transitory, computer readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for configuring a memory controller, the computing device comprising: means for reserving a space in a memory of the computing device for performing a memory training, wherein the reserved space is inaccessible to an operating system of the computing device; means for performing the memory training within the reserved space in the memory of the computing device to determine configuration settings of the memory controller; and means for configuring the memory controller with the determined configuration settings.

Example 31 includes the subject matter of Example 30, and wherein the means for determining the configuration settings comprises means for determining an optimal voltage parameter or an optimal timing parameter.

Example 32 includes the subject matter of any of Examples 30 and 31, and further comprising means for storing the configuration settings of the memory controller in a data storage of the computing device.

Example 33 includes the subject matter of any of Examples 30-32, and wherein the means for storing the configuration settings comprises means for storing the configuration settings in the data storage in response to configuring the memory controller with the determined configuration settings.

Example 34 includes the subject matter of any of Examples 30-33, and further comprising: means for booting the computing device; and means for determining whether there are configuration settings stored in a data storage of the computing device in response to booting the computing device; wherein the means for configuring the memory controller comprises means for configuring the memory controller with the configuration settings stored in the data storage in response to determining that there are configuration settings stored in the data storage.

Example 35 includes the subject matter of any of Examples 30-34, and wherein the means for performing the memory training comprises means for performing the memory training during a boot phase of the computing device.

Example 36 includes the subject matter of any of Examples 30-35, and wherein the means for performing the memory training comprises means for performing the memory training during normal operation of the computing device.

Example 37 includes the subject matter of any of Examples 30-36, and further comprising: means for temporarily limiting access to the memory of the computing device in response to performing the memory training during normal operation of the computing device; wherein the means for configuring the memory controller with the determined configuration settings comprises means for configuring the memory controller in response to temporarily limiting the access to the memory of the computing device.

Example 38 includes the subject matter of any of Examples 30-37, and further comprising means for resuming access to the memory in response to configuring the memory controller with the determined configuration settings.

Example 39 includes the subject matter of any of Examples 30-38, and wherein the means for performing the memory training during normal operation of the computing device further comprises: means for executing an operating system with the computing device; and means for performing the memory training contemporaneously with executing the operating system with the computing device.

Example 40 includes the subject matter of any of Examples 30-39, and wherein the reserved space in the memory comprises a memory bank of the memory for performing the memory training.

Example 41 includes the subject matter of any of Examples 30-40, and wherein the reserved space in the memory is accessed by a plurality of signal lines of the computing device, wherein the signal lines couple the memory controller to the memory.

Example 42 includes the subject matter of any of Examples 30-41, and wherein the memory controller and the memory are coupled by a plurality of data signal lines and a plurality of I/O address lines, wherein the signal lines comprise the data signal lines and the I/O address lines.

The invention claimed is:

1. A computing device for configuring a memory controller, the computing device comprising:
   a processor; and
   a memory storing a plurality of instructions, which, when executed by the processor, causes the computing device to:
   reserve a space in the memory of the computing device to perform a memory training, wherein the reserved space in the memory is inaccessible to an operating system of the computing device;
   perform the memory training within the reserved space to determine configuration settings of the memory controller, wherein to perform the memory training comprises to perform the memory training during normal operation of the computing device, and wherein to perform the memory training during normal operation of the computing device comprises to (i) execute the operating system with the computing device and (ii) perform the memory training contemporaneously with execution of the operating system;
   limit access by the operating system to the memory of the computing device in response to the performance of the memory training during normal operation of the computing device; and
   configure the memory controller with the determined configuration settings in response to limiting the access to the memory of the computing device.

2. The computing device of claim 1, wherein to determine the configuration settings comprises to determine a voltage parameter or a timing parameter.

3. The computing device of claim 1, wherein the plurality of instructions further causes the computing device to store the configuration settings of the memory controller in a data storage of the computing device.

4. The computing device of claim 1, wherein the plurality of instructions further causes the computing device to:
   boot the computing device; and
   determine whether there are configuration settings stored in a data storage of the computing device in response to the boot of the computing device;
   wherein to configure the memory controller comprises to configure the memory controller with the configuration settings stored in the data storage in response to a determination that there are configuration settings stored in the data storage.

5. The computing device of claim 1, wherein the plurality of instructions further causes the computing device to resume access by the operating system to the memory of the computing device in response to the configuration of the memory controller with the determined configuration settings.

6. The computing device of claim 1, wherein the reserved space it the memory comprises a memory bank of the memory to perform the memory training.

7. The computing device of claim 1, wherein the reserved space in the memory is accessed by a plurality of signal lines of the computing device, wherein the signal lines couple the memory controller to the memory.

8. The computing device of claim 7, wherein the memory controller and the memory are coupled by a plurality of data signal lines and a plurality of I/O address lines, wherein the signal lines comprise the data signal lines and the I/O address lines.

9. A method for configuring a memory controller, the method comprising:
   reserving, by a computing device, a space in a memory of the computing device for performing a memory training, wherein the reserved space in the memory is inaccessible to an operating system of the computing device;
   performing, by the computing device, the memory training within the reserved space in the memory of the computing device to determine configuration settings of the memory controller, wherein performing the memory training comprises performing the memory training during normal operation of the computing device, and wherein performing the memory training during normal operation of the computing device comprises (i) executing the operating system with the computing device and (ii) performing the memory training contemporaneously with executing the operating system;
   limiting, by the computing device, access by the operating system to the memory of the computing device in response to performing the memory training during normal operation of the computing device; and
   configuring, by the computing device, the memory controller with the determined configuration settings in response to limiting the access to the memory of the computing device.

10. The method of claim 9, further comprising storing, by the computing device, the configuration settings of the memory controller in a data storage of the computing device.

11. The method of claim 9, further comprising:
    booting the computing device; and
    determining, by the computing device, whether there are configuration settings stored in a data storage of the computing device in response to booting the computing device;
    wherein configuring the memory controller comprises configuring the memory controller with the configuration settings stored in the data storage in response to determining that there are configuration settings stored in the data storage.

12. The method of claim 9, wherein the reserved space in the memory comprises a memory bank of the memory for performing the memory training.

13. The method of claim 9, wherein the reserved space in the memory is accessed by a plurality of signal lines of the computing device, wherein the signal lines couple the memory controller to the memory.

14. One or more non-transitory, computer readable storage media comprising a plurality of instructions that in response to being executed cause a computing device to:
    reserve a space in a memory of the computing device for performing a memory training, wherein the reserved space in the memory is inaccessible to an operating system of the computing device;
    perform the memory training within the reserved space in the memory of the computing device to determine configuration settings of the memory controller, wherein to perform the memory training comprises to perform the memory training during normal operation of the computing device, and wherein to perform the memory training during normal operation of the computing device comprises to (i) execute the operating system with the computing device and (ii) perform the memory training contemporaneously with executing the operating system;
    limit access by the operating system to the memory of the computing device in response to performing the memory training during normal operation of the computing device; and
    configure the memory controller with the determined configuration settings in response to limiting the access to the memory of the computing device.

15. The one or more computer readable storage media of claim 14, further comprising a plurality of instructions that in response to being executed cause the computing device to store the configuration settings of the memory controller in a data storage of the computing device.

16. The one or more computer readable storage media of claim 14, further comprising a plurality of instructions that in response to being executed cause the computing device to:
    boot the computing device; and
    determine whether there are configuration settings stored in a data storage of the computing device in response to booting the computing device;
    wherein to configure the memory controller comprises to configure the memory controller with the configuration settings stored in the data storage in response to determining that there are configuration settings stored in the data storage.

17. The one or more computer readable storage media of claim 14, wherein the reserved space in the memory comprises a memory bank of the memory for performing the memory training.

18. The one or more computer readable storage media of claim 14, wherein the reserved space in the memory is accessed by a plurality of signal lines of the computing device, wherein the signal lines couple the memory controller to the memory.

\* \* \* \* \*